(12) United States Patent
Yang

(10) Patent No.: US 8,150,260 B2
(45) Date of Patent: Apr. 3, 2012

(54) OPTICAL NETWORK TERMINAL, METHOD FOR CONFIGURING RATE LIMITING ATTRIBUTES OF PORTS, AND METHOD FOR PROCESSING PACKETS

(75) Inventor: Sulin Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 726 days.

(21) Appl. No.: 12/236,796

(22) Filed: Sep. 24, 2008

(65) Prior Publication Data

US 2009/0022494 A1    Jan. 22, 2009

Related U.S. Application Data

(63) Continuation of application No. PCT/CN2007/000994, filed on Mar. 28, 2007.

(30) Foreign Application Priority Data

Apr. 26, 2006   (CN) .......................... 2006 1 0060495

(51) Int. Cl.
*H04B 10/20* (2006.01)
(52) U.S. Cl. .............................. 398/63; 398/58; 398/168
(58) Field of Classification Search ............... 398/63, 398/58, 168
See application file for complete search history.

(56) References Cited

U.S. PATENT DOCUMENTS

| 6,633,541 | B1 | 10/2003 | Hijikata et al. | |
|---|---|---|---|---|
| 6,721,797 | B1 * | 4/2004 | Kim | .............................. 709/232 |
| 7,277,637 | B2 * | 10/2007 | Jette et al. | ........................ 398/70 |
| 7,672,233 | B2 | 3/2010 | Koch et al. | |
| 2001/0008455 | A1 | 7/2001 | Saikusa | |
| 2002/0171895 | A1 | 11/2002 | Chang | |
| 2006/0013139 | A1 | 1/2006 | Koch | |

FOREIGN PATENT DOCUMENTS

| CN | 1346182 A | 4/2002 |
|---|---|---|
| CN | 1547814 A | 11/2004 |
| CN | 1574709 A | 2/2005 |
| EP | 1 158 830 A1 | 11/2001 |
| JP | 2005-33537 A | 2/2005 |

OTHER PUBLICATIONS

Communication issued in corresponding European Patent Application No. 07720568.0, mailed Dec. 10, 2010.

(Continued)

*Primary Examiner* — Kinam Park

(57) ABSTRACT

The present invention relates to an optical network terminal (ONT), a method for configuring rate limiting attributes of ports, and a method for processing packets. The ONT includes a passive optical network (PON) protocol processing module, and a user network interface (UNI) module, which are connected through an internal interface. The ONT also includes a port rate limiting module connected to a UNI. The port rate limiting module stores rate limiting attributes, and the ONT uses these attributes to control the traffic of the UNI. The port rate limiting attributes are configured for the ONT through an ONT management and control interface (OMCI) message of an optical line terminal (OLT). In this way, when the ONT receives data from the UNI, it can control the traffic of the UNI according to the port rate limiting attributes. The present invention enables the port rate limiting function for the ONT, prevents overflow of the internal receiving buffer of the ONT, and prevents denial of service (DoS) attacks from illegal users.

14 Claims, 5 Drawing Sheets

OTHER PUBLICATIONS

Office Action issued in corresponding Chinese Patent Application No. 200780000314.X; issued Apr. 13, 2010.

International Preliminary Report on Patentability issued in corresponding PCT Application No. PCT/CN2007/000994; issued Oct. 28, 2008.

"Series G: Transmission Systems and Media, Digital Systems Networks—Digital Selections and Digital Line System—Optical Line Systems for Local and Access Networks" International Telecommunication Union. Feb. 2004.

"Series G: Transmission Systems and Media, Digital Systems Networks—Digital Selections and Digital Line System—Optical Line Systems for Local and Access Networks" International Telecommunication Union. Jun. 2004.

"Series G: Transmission Systems and Media, Digital Systems Networks—Digital Selections and Digital Line System—Optical Line Systems for Local and Access Networks" International Telecommunication Union. Jun. 2005.

"Series G: Transmission Systems and Media, Digital Systems Networks—Digital Selections and Digital Line System—Optical Line Systems for Local and Access Networks" International Telecommunication Union. Jul. 2005.

"Series G: Transmission Systems and Media, Digital Systems Networks—Digital Selections and Digital Line System—Optical Line Systems for Local and Access Networks (Amendment 1)" International Telecommunication Union. Mar. 2006.

Series G: Transmission Systems and Media, Digital Systems Networks—Digital Selections and Digital Line System—Optical Line Systems for Local and Access Networks (Amendment 2) International Telecommunication Union. Mar. 2006.

Office Action issued in corresponding Chinese Patent Application No. 200780000314.X; issued Apr. 13, 2010.

"Gigabit-Capable Passive Optical Networks (G-Pon): OMT Management and Control Interface Specification". Geneva, CH: International Telecommunication Union, Jun. 2004.

Tsang, I-J et al. "GigaPON Access Network Top Level Specification of the PTSP, TC and MAC Components" Jul. 13, 2004. <http://www.ist-optimist.org/pdf.network/projects_public/GIANT/Deliverables/D41.pdf>.

Supplementary European Search Report issued in corresponding European Patent Application No. 07 72 0568; issued Apr. 15, 2009.

Search Report issued in corresponding PCT Application PCT/CN2007/000994; mailed Jun. 28, 2007.

Office Action issued in corresponding Chinese Patent Application No. 2006100604952; issued Dec. 3, 2008.

First Chinese Office Action issued in corresponding Chinese Patent Application No. 200810189644.4, mailed Sep. 2, 2010.

* cited by examiner

OPTICAL NETWORK TERMINAL, METHOD FOR CONFIGURING RATE LIMITING ATTRIBUTES OF PORTS, AND METHOD FOR PROCESSING PACKETS

RELATED APPLICATIONS

This application is a continuation of International Application No. PCT/CN2007/000994, filed on Mar. 28, 2007, which claims priority to Chinese Patent Application No. 200610060495.2, filed on Apr. 26, 2006, both of which are hereby incorporated by reference in their entireties.

FIELD OF THE INVENTION

The present invention relates to the field of passive optical network (PON), and in particular, to an optical network terminal (ONT) in the PON system, a method for configuring rate limiting attributes of ports, and a method for processing packets.

BACKGROUND OF THE INVENTION

At present, the broadband access technology comes in two types: copper wire access technology such as digital subscriber line (xDSL) technology and optical access technology. An access network based on the optical access technology is called an optical access network (OAN).

The PON technology is an optical access technology for point-to-multipoint transfer. FIG. 1 shows a PON system. A PON system includes an optical line terminal (OLT), an optical distribution network (ODN), and an optical network unit (ONU). The OLT provides a service node interface (SNI) for the OAN, and is connected to one or more ODNs. An ODN is a passive optical splitting component, which transmits the downstream data of the OLT to each ONU through optical splitting. Likewise, the ODN transmits the upstream data of the ONU to the OLT through convergence. The ONU provides a user network interface (UNI) for the OAN, and is connected to the ODN. If the ONU also provides the user port function, for example, Ethernet user port or plain old telephone service (POTS) user port, the ONU is called an "ONT". Unless otherwise specified, ONU and ONT are collectively called "ONT" hereinafter.

In the general PON access technology, the downstream traffic of the OLT is broadcast to each ONT through time division multiplexing (TDM), and each ONT receives the traffic as required; the upstream traffic of the ONT is controlled through the OLT, so that only a specific ONT is allowed to transmit data at a time and the data is transmitted to the OLT through time division multiple access (TDMA).

The ITU-T has established the broadband passive optical network (BPON) standard and the gigabit passive optical network (GPON) standard. The OLT configuration and ONT management modes are defined in the BPON and GPON standards. The OLT manages the ONT through an ONU management and control interface (OMCI) path. An OMCI is a configuration transmission path defined in the BPON and GPON standards. It is set up by the ONT between the OLT and the ONT when the ONT is registered at the OLT. The OMCI is a master-slave management protocol, in which the OLT is a master device and the ONT is a slave device. Through an OMCI path, the OLT controls multiple ONIs connected under it.

In the OMCI protocol, the ONT data managed by the OLT is abstracted into an independent management information base (MIB). A basic unit of the MIB is management entity (ME). According to the function configuration of the ONT, multiple MEs of the ONT are controlled by the OLT through an OMCI, as defined by the BPON and GPON standards. Under the control of the OLT, the ONT implements the configuration and management of all the MEs.

A network device generally has more than one port. A data stream flows in from certain ports, and flows out of other ports after being processed or buffered through a network device. Suppose that the data stream flows in from port A, and flows out of port B. This case may occur: When the rate of the data stream from port A is greater than the rate of the data stream out of port B, the buffer room in the device diminishes gradually. If this case continues for a sufficient time, the buffer inside the device overflows, and the data packets are hence lost. The duration depends on the size of the buffer inside the device, and the ratio of the inbound rate at port A to the outbound rate at port B. The greater the buffer is, the longer time it will take for the buffer to overflow; the greater the ratio of the inbound rate at port A to the outbound rate at port B is, the shorter time it will take for the buffer to overflow. The foregoing case can be prevented by limiting the inbound rate of the data stream at port A.

FIG. 2 shows how an ONT with n Ethernet ports processes the upstream Ethernet packets to the OLT in a GPON system. The Ethernet packets "E1" and "E2" from a customer premises equipment (CPE) 1 are converged with the Ethernet packet "E3" from a CPE n by a medium access control (MAC) bridge module 21 of the ONT, and sent to a GPON protocol processing module 22 through an internal Ethernet port. The GPON protocol processing module 22 adds the corresponding GPON protocol packet header information Px, Py, and Pz into the packets and then sends the packets to the OLT in the allocated timeslots. When the sum of the rates of data streams received by the MAC bridge module 21 of the ONT from all the UNIs is greater than the total upstream bandwidth of the ONT allocated by the OLT, it is necessary to perform traffic control for the data streams on the ONT to prevent overflow of the internal receiving buffer of the ONT. Moreover, when multiple users share an ONT and each user occupies an Ethernet port of the ONT, if a user supports sending of traffic greater than the traffic of the bandwidth allocated by the OLT to the ONT, congestion will occur in the MAC bridge module 21 of the ONT, and the ONT will discard the packets beyond the allocated bandwidth. Consequently, the denial of service (DoS) attack occurs, and affects normal services of other users.

A traffic descriptor ME is defined in the BPON and GPON standards. The GPON encapsulation method (GEM) traffic descriptor ME monitors the upstream traffic identified by the GEM Port-ID. This ME is associated with the GEM port network connection termination point (CTP) ME. This ME is described below:

ME: GEM traffic descriptor.

Data relationship: This ME is associated with a GEM port network CTP ME. The features of the upstream traffic identified by the GEM Port-ID are expressed by this ME.

The attributes of this ME are shown in Table 1

TABLE 1

| ME ID | This attribute provides a unique ID for each instance of the ME. (mandatory, 2 bytes) |
|---|---|
| SIR | This attribute represents the sustained information rate (SIR), measured in byte/s. (optional, 4 bytes) |
| PIR | This attribute represents the peak information rate (PIR), measured in byte/s. (optional, 4 bytes) |

In the GPON standard, the GEM traffic descriptor ME is associated with the GEM port network CTP, both being used to configure and manage the corresponding attributes in the GPON protocol processing module in the ONT. The GEM port network CTP configures and manages a GEM Port. Therefore, when a data stream passes through this GEM port, traffic control will be performed according to the GEM traffic descriptor.

In the prior art, the traffic control is performed only at the GEM port network CTP. As shown in FIG. 2, when the sum of the rates of data received by multiple UNIs is greater than the rate of data transmitted from the MAC bridge module to the GPON protocol processing module through an internal Ethernet port, a traffic conflict occurs on the MAC bridge module. Suppose that the rate of a data stream received by UNI 1 is high but the data significance is low, while the rate of another data stream received by UNI n is low but the data significance is high. The low-significance and high-rate data stream at UNI 1 may lead to loss of the high-significance and low-rate data stream at UNI n.

SUMMARY OF THE INVENTION

An embodiment of the present invention provides an ONT, a method for configuring the rate-limiting attributes of ports, and a method for processing packets to enable the port rate limiting function, to prevent overflow of the internal receiving buffer of the ONT and to prevent denial of service (DoS) attacks from illegal users.

An ONT provided in an embodiment of the present invention includes: (i) a passive optical network (PON) protocol processing module and a user network interface (UNI) module, both being connected through an internal interface, where the UNI module provides multiple UNIs; and (ii) a port rate limiting module connected to a UNI, where the port rate limiting module stores port rate limiting attributes, and the ONT uses these attributes to control the traffic of the UNI.

A method for configuring ONT port rate limiting attributes provided in an embodiment of the present invention includes: receiving, by an ONT, an OMCI message from an OLT, where the message carries the port rate limiting attributes for performing traffic control for a UNI; and storing the port rate limiting attributes into a management entity (ME).

A method for processing packets by an ONT provided in an embodiment of the present invention includes: receiving data from or sending data to a UNI; calculating the rate of the data received from or sent to the UNI; and performing traffic control for the UNI when the rate of the data sent/received at the UNI is greater than the value preset in the port rate limiting attributes for the UNI.

The ONT in this embodiment of the invention contains a port rate limiting module connected to the UNI, and therefore overflow of the internal receiving buffer of the ONT and DoS attacks from illegal users may be prevented.

According to the method for configuring port rate limiting attributes of an ONT provided in an embodiment of the present invention, the port rate limiting attributes are configured for the ONT through a configuration terminal, and the ONT stores the port rate limiting attributes into an ME, so that the ONT can implement the port rate limiting function according to the port rate limiting attributes.

The method for processing packets by an ONT provided in an embodiment of the present invention judges whether the rate of the data transmitted through a UNI is greater than the value set in the port rate limiting attributes of the UNI. If so, traffic control is performed for the UNI to prevent overflow of the internal receiving buffer of the ONT and prevent DoS attacks from illegal users.

DETAILED DESCRIPTION OF THE INVENTION

The following text describes an ONT, a method for configuring port rate limiting attributes and a method for processing packets according to embodiments of the present invention, supposing that the ONT provides Ethernet user ports in the GPON system.

For an ONT with Ethernet user ports in the GPON system, the UNI module is a MAC bridge module; the internal interface is an internal Ethernet port; and the PON protocol processing module is a GPON protocol processing module.

Figure 1:
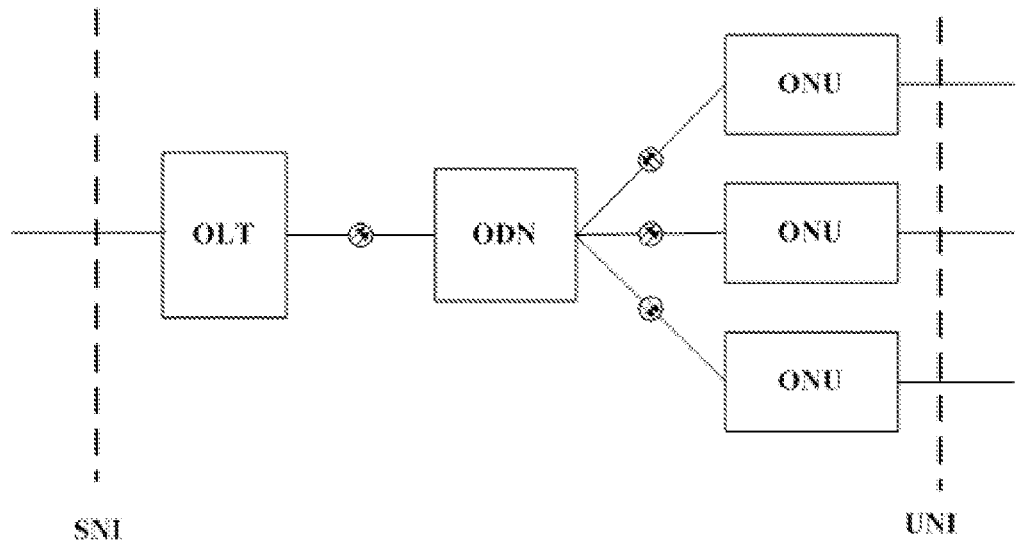
FIG. 1 shows a PON system in the prior art.
Figure 2:
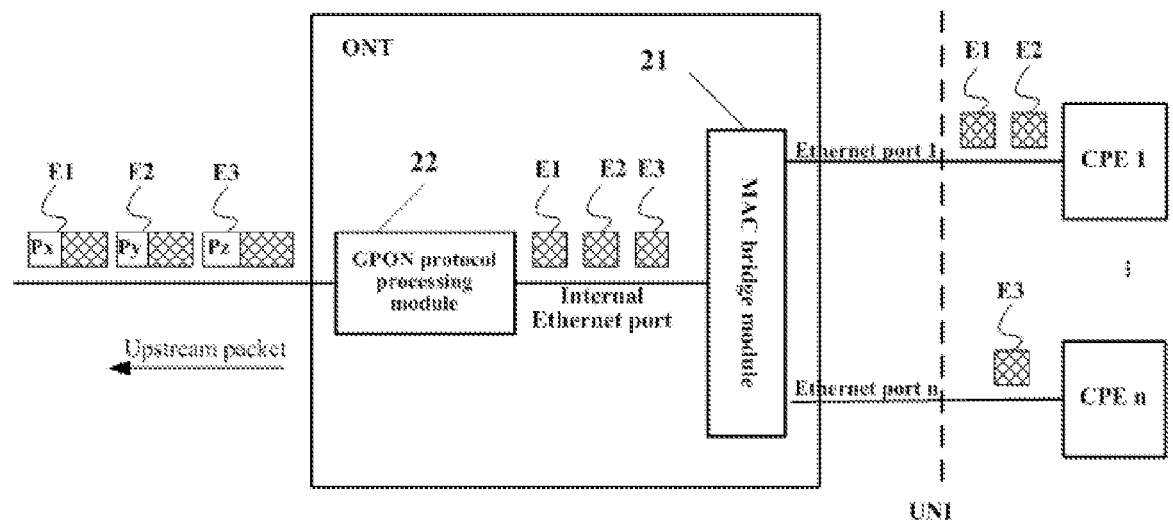
FIG. 2 shows how an ONT with n Ethernet ports processes the upstream Ethernet packets to the OLT in a GPON system in the prior art.
Figure 3:
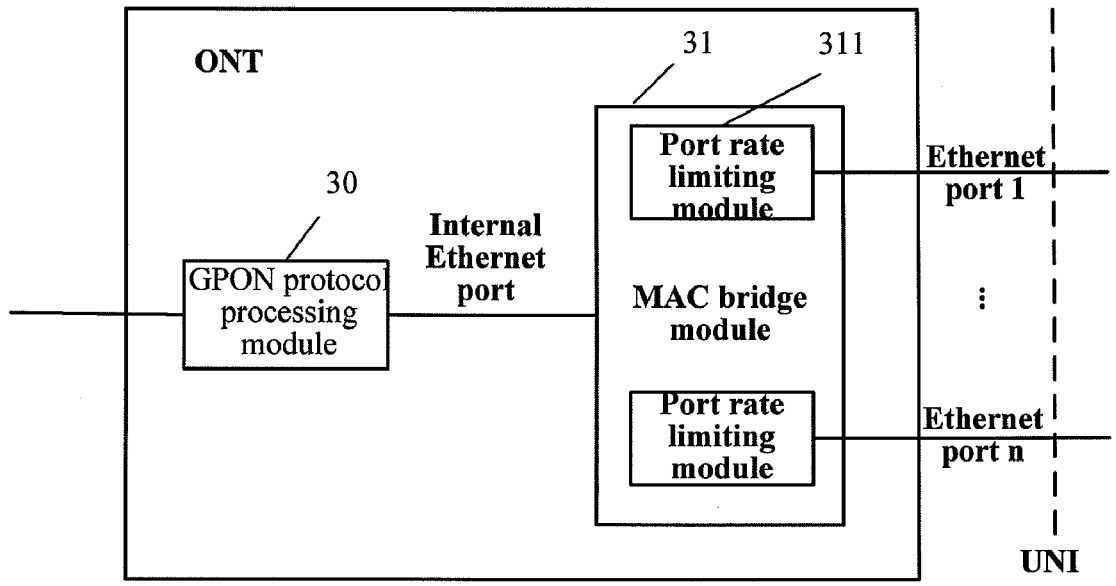
FIG. 3 to FIG. 6 show the structure of an ONT according to an embodiment of the present invention.

FIG. 3 shows the structure of an ONT according to the first embodiment of the present invention.

In the first embodiment, an ONT includes: a GPON protocol processing module 30 connected through an internal Ethernet port with a MAC bridge module 31, and multiple port rate limiting modules 311 inside the MAC bridge module 31, where the port rate limiting modules 311 are connected in series with the UNIs, that is, data streams need to pass through the port rate limiting modules. In the first embodiment, the MAC bridge module 31 contains multiple port rate limiting modules 311, and each port rate limiting module is connected to a UNI, that is, the ONT performs the rate limiting function at each UNI in a distributed way.

Each port rate limiting module 311 stores the port rate limiting attributes. The ONT receives data from a UNI, and calculates the rate of the data received from the UNI. Traffic control is performed for the UNI when the rate of the data received at the UNI is greater than the value preset in the port rate limiting attributes for the UNI.

In the first embodiment, the upstream data arrives at the MAC bridge module first, and then the data streams undergo rate limiting processing inside the MAC bridge module; the downstream data streams undergo the processing at the port rate limiting module, and then flow out of the MAC bridge module.

Figure 4:
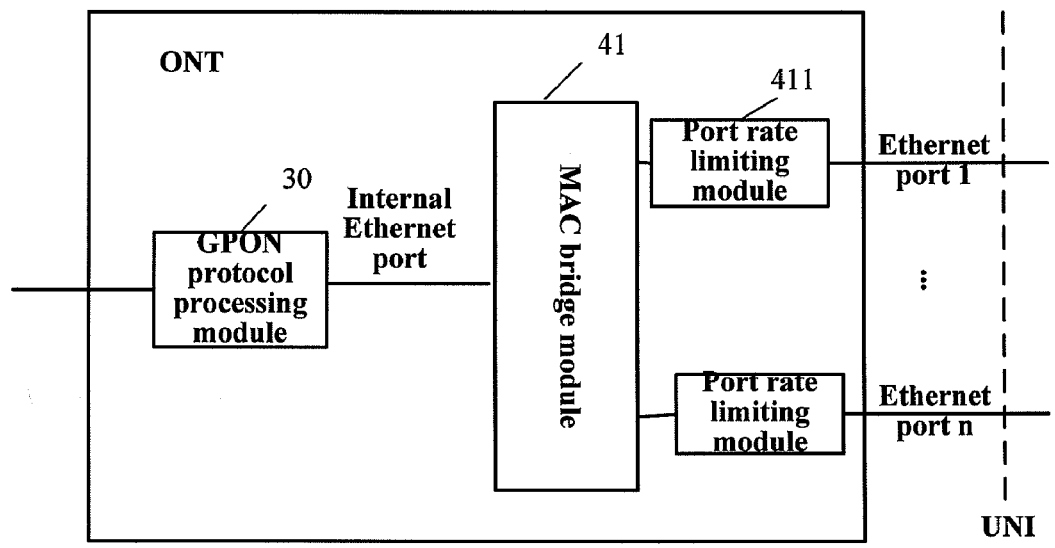

FIG. 4 shows the structure of an ONT according to the second embodiment of the present invention.

In the second embodiment, an ONT includes: a GPON protocol processing module 30 connected through an internal Ethernet port with a MAC bridge module 41, and multiple port rate limiting modules 411 outside the MAC bridge module 41, where the port rate limiting modules 411 are connected in series with the UNIs, that is, data streams need to pass through the port rate limiting modules. In the second embodiment, the ONT contains multiple port rate limiting modules 411, and each port rate limiting module is connected to a UNI, that is, the ONT performs the rate limiting function at each UNI in a distributed way.

Each port rate limiting module 411 stores the port rate limiting attributes. The ONT receives data from a UNI, and calculates the rate of the data received from the UNI. Traffic control is performed for the UNI when the rate of the data received at the UNI is greater than the value preset in the port rate limiting attributes for the UNI.

In the second embodiment, the upstream data undergoes rate limiting processing through the port rate limiting module, and then arrives at the MAC bridge module; the downstream data streams flow out of the MAC bridge module and then undergo the processing at the port rate limiting module.

Figure 5:
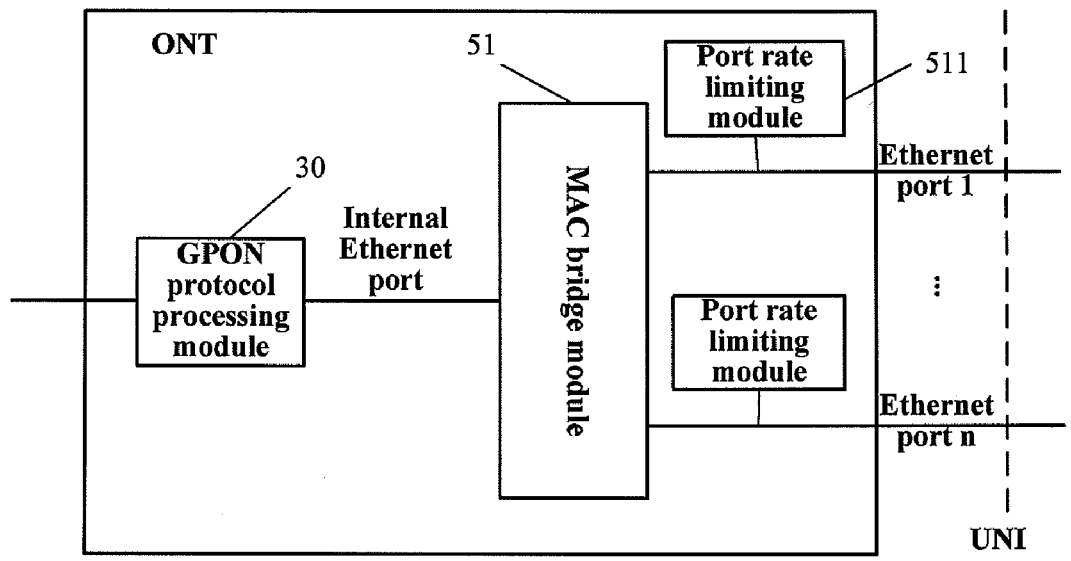

FIG. 5 shows the structure of an ONT according to the third embodiment of the present invention.

In the third embodiment, an ONT includes: a GPON protocol processing module 30 connected through an internal Ethernet port with a MAC bridge module 51, and multiple port rate limiting modules 511 outside the MAC bridge module 51, where the port rate limiting modules 511 are connected in parallel with the UNIs, that is, data streams do not pass through the port rate limiting modules, and the UNIs limit the rate of the data streams according to the settings of the port rate limiting modules. In the third embodiment, the ONT contains multiple port rate limiting modules 511, and each port rate limiting module is connected to a UNI, that is, the ONT performs the rate limiting function at each UNI in a distributed way.

Each port rate limiting module 511 stores the port rate limiting attributes. The ONT receives data from a UNI, and calculates the rate of the data received from the UNI. Traffic control is performed for the UNI when the rate of the data received at the UNI is greater than the value preset in the port rate limiting attributes for the UNI.

In the embodiment shown in FIG. 4, the port rate limiting modules are connected in series with the UNIs, that is, data streams pass through the port rate limiting modules that perform rate limiting processing directly.

In the embodiment shown in FIG. 5, the port rate limiting modules are connected in parallel with the UNIs, that is, data streams do not pass through the port rate limiting modules, and the port rate limiting modules control the UNIs to limit the rate of data streams.

In the embodiments shown in FIG. 3 to FIG. 5, each port rate limiting module is connected to a UNI. In other words, the ONT performs the rate limiting function at each UNI in a distributed way. Additionally or alternatively, the rate-limiting function may be implemented at each UNI in a centralized way.

Figure 6:
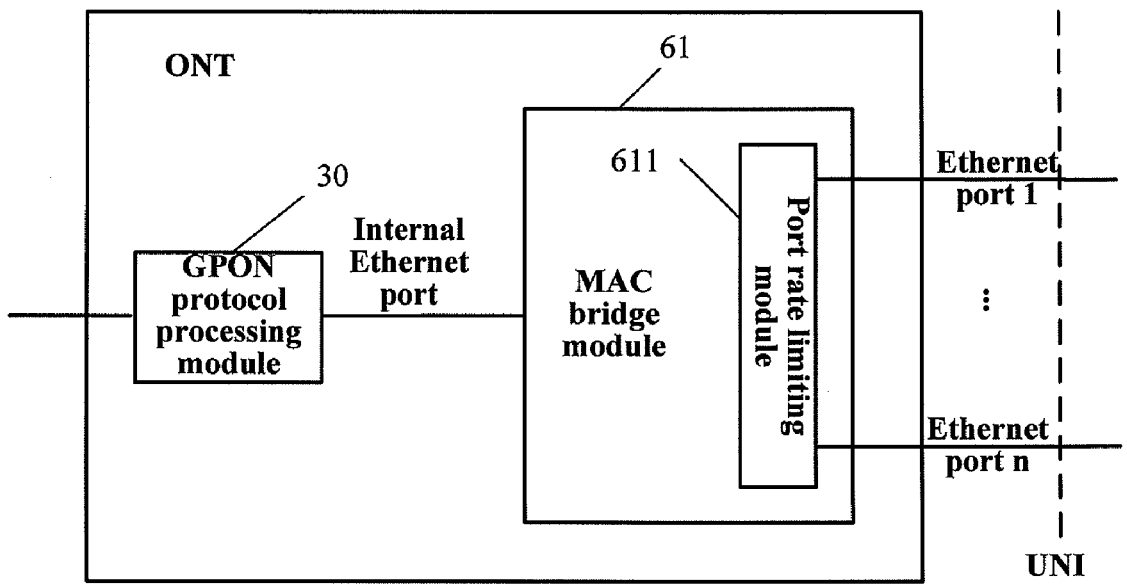

FIG. 6 shows the structure of an ONT according to the fourth embodiment of the present invention.

In the fourth embodiment, an ONT includes: a GPON protocol processing module 30 connected through an internal Ethernet port with and a MAC bridge module 61. The MAC bridge module 61 contains a port rate limiting module 611 which is connected to all UNIs. That is, the ONT performs the rate limiting function at each UNI in a centralized way.

In the fourth embodiment, the ONT implements the port rate limiting function through a UNI traffic descriptor ME defined in the ME of the OMCI. This ME is described below:

ME: UNI traffic descriptor

Data relationship: Each instance of the UNI traffic descriptor ME corresponds to a UNI physical port of an ONT, which is an Ethernet physical port in this embodiment. The ME is managed through a physical path termination point Ethernet UNI.

The attributes of this ME are shown in Table 2:

TABLE 2

| | |
|---|---|
| ME ID | This attribute provides a unique ID for each instance of the ME, and this ID is the same as the ID of the UNI physical path termination point ME. (read only, set through creation) (mandatory, 2 bytes) |
| USIR | This attribute represents the upstream sustained information rate (USIR), measured in byte/s. (optional, 4 bytes) |
| UPIR | This attribute represents the upstream peak information rate (PIR), measured in byte/s. (optional, 4 bytes) |
| DSIR | This attribute represents the downstream sustained information rate (DSIR), measured in byte/s. (optional, 4 bytes) |
| DPIR | This attribute represents the downstream peak information rate (DPIR), measured in byte/s. (optional, 4 bytes) |

Port rate limiting attributes may constitute a separate ME (as in the solution mentioned above), or the parameters of the port rate limiting attributes are added to other MEs. The port rate limiting attributes are not limited to the parameters listed above.

This embodiment of the invention further provides a method for configuring port rate limiting attributes of an ONT, in which the ONT receives an OMCI message from an OLT; the message carries the port rate limiting attributes for traffic control on a UNI; and the ONT stores the port rate limiting attributes in an ME.

Figure 7:
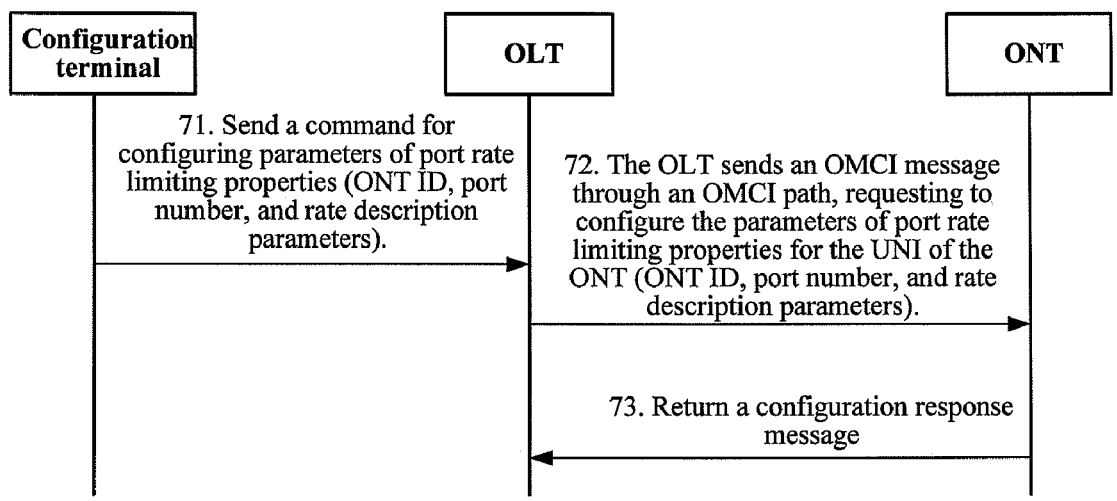
FIG. 7 shows how a configuration terminal configures the port rate limiting attributes for a UNI of the ONT through an OLT according to an embodiment of the present invention.

As shown in FIG. 7, the method for configuring the port rate limiting attributes of a UNI of the ONT through an OLT according to an embodiment of the present invention includes the following steps:

71. The configuration terminal sends a command for configuring port rate limiting attributes to the OLT, in which the configuration parameters of the port rate limiting attributes include an ONT ID, the port number of the UNI that needs configuration of port rate limiting attributes, and rate description parameters of the UNI (including upstream peak rate, and upstream sustained rate);

72. The OLT sends an OMCI message to the ONT through an OMCI path, requesting to configure the port rate limiting attributes of the UNI of the ONT. The configuration parameters of the port rate limiting attributes in the OMCI message include an ONT ID, the port number of the UNI that needs configuration of port rate limiting attributes, and rate description parameters of the UNI (including upstream peak rate, upstream sustained rate, downstream peak rate and downstream sustained rate);

73. The ONT stores the port rate limiting attributes into the ONI traffic descriptor ME, and returns a configuration response message to the OLT.

In addition or alternatively, the configuration terminal may send a command for configuring port rate limiting attributes to the ONT through direct control (based on a local serial port) or remote control (based on Telnet or an NMS), and the ONT stores the port rate limiting attributes in the configuration command into the UNI traffic descriptor ME. Moreover, the port rate limiting attributes may also be stored in other MEs.

Figure 8:
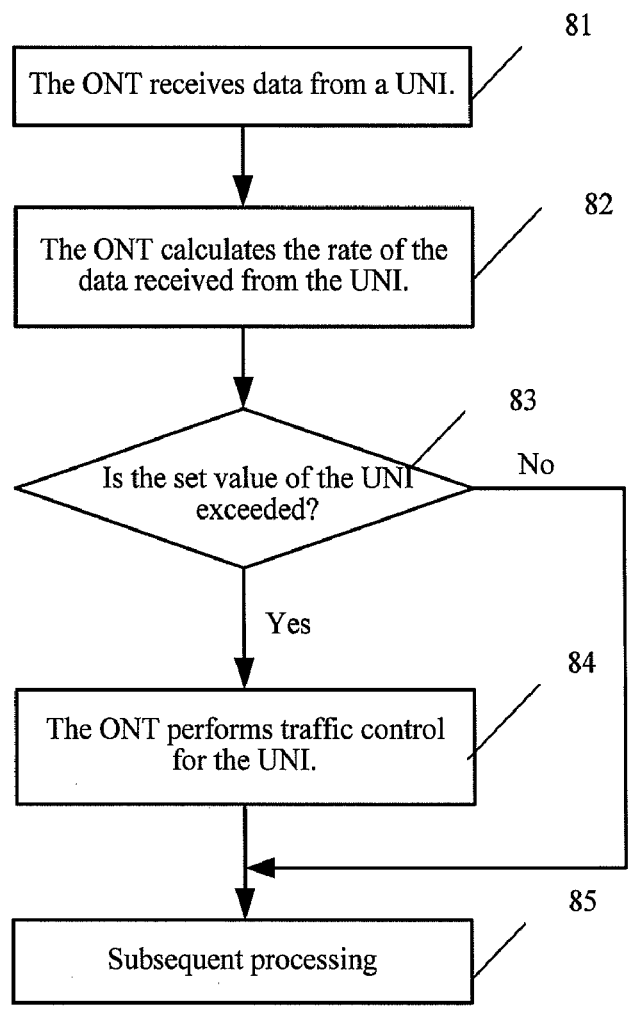
FIG. 8 is a flowchart of processing upstream packets by an ONT, with port rate limiting attributes configured for a UNI according to an embodiment of the present invention.

In this way, when the ONT receives or sends data through a UNI, traffic control can be performed according to the port rate limiting attributes stored in the ME to limit the port rate. As shown in FIG. 8, the method for processing upstream packets by an ONT in an embodiment of the invention includes the following steps:

81. The ONT receives data from a UNI;

82. The ONT calculates the rate of the data received from the UNI, including the peak rate and the sustained rate. The peak rate refers to a data rate in a short time such as the average rate of packets received within 1 second; the sustained rate refers to the data rate in a relatively long time such as the average rate of packets received within 1 minute or 1 hour; the rate of the received data can be measured through a mean value algorithm or other algorithms;

83. The ONT judges whether the rate of the data received from the UNI exceeds the value set in the port rate limiting attributes for the UNI; if not, the process goes to step 85, or else step 84;

84. The ONT performs traffic control for the UNI based on the "tail drop" or "random drop" policy, for example, random early detection/weighted random early detection (RED/WRED) algorithm;

85. Subsequent processing.

Figure 9:
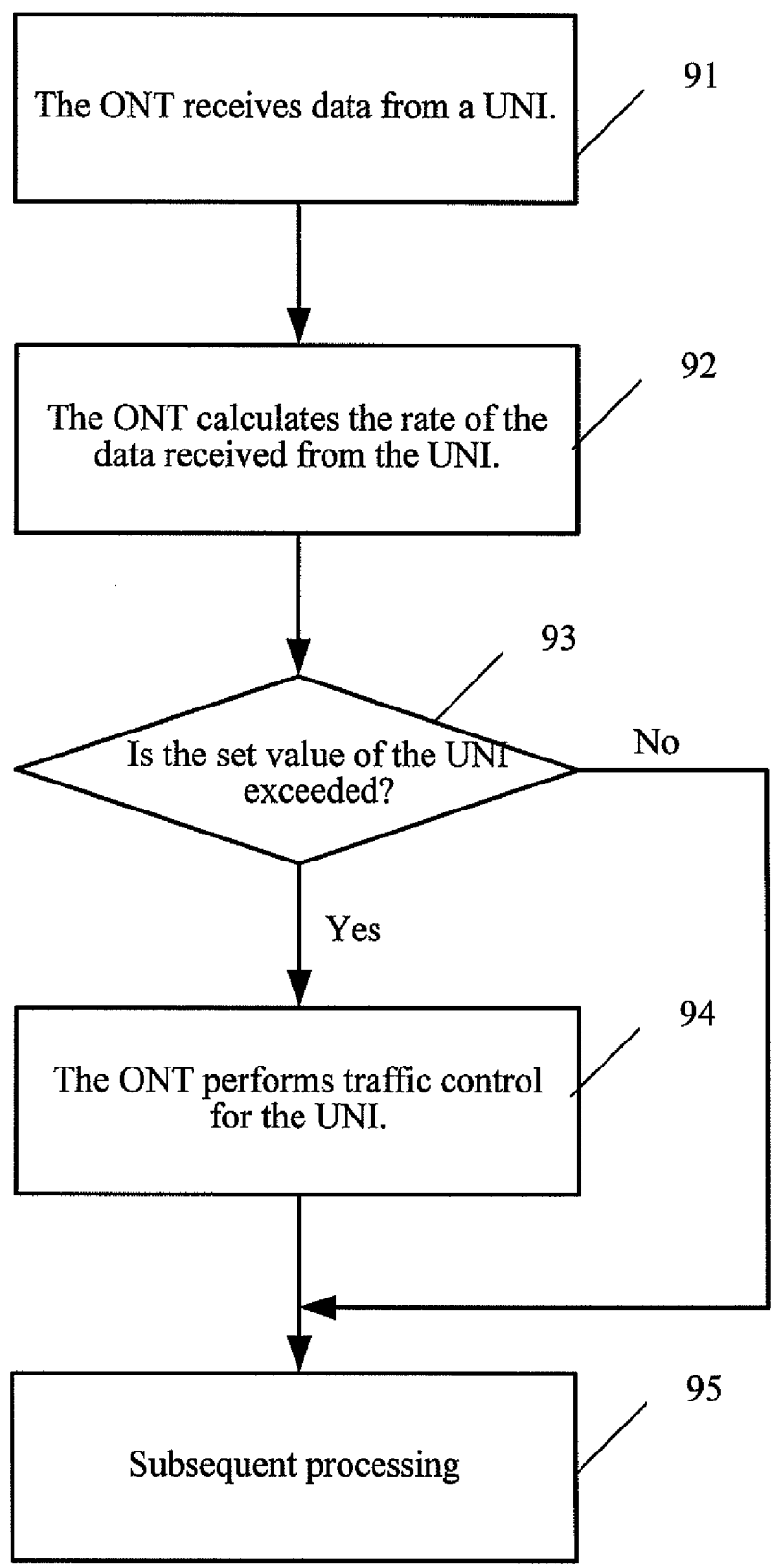
FIG. 9 is a flowchart of processing downstream packets by an ONT, with port rate limiting attributes configured for a UNI according to an embodiment of the present invention.

As shown in FIG. 9, the method for processing downstream packets by an ONT in an embodiment of the invention includes the following steps:

91. The ONT sends data from a UNI;

92. The ONT calculates the rate of the data sent by the UNI, including the peak rate and the sustained rate. The peak rate refers to a data rate in a short time such as the average rate of packets received within 1 second; the sustained rate refers to the data rate in a relatively long time such as the average rate of packets received within 1 minute or 1 hour; the rate of the sent data can be measured through a mean value algorithm or other algorithms.

93. The ONT judges whether the rate of the data sent by the UNI exceeds the value set in the port rate limiting attributes for the UNI; if not, the process goes to step 95, or else step 94;

94. The ONT performs traffic control for the UNI based on the "tail drop" or "random drop" policy, for example RED/WRED algorithm;

95. Subsequent processing.

In the foregoing embodiments of the invention, an ONT judges whether the rate of the data transmitted through a UNI is greater than the value set in the port rate limiting attributes for the UNI. If so, traffic control is performed for the UNI to prevent overflow of the internal receiving buffer of the ONT and prevent DoS attacks from illegal users.

One of ordinary skill in the art will understand that all or part of the steps in the preceding embodiments can be completed through a program which instructs related hardware. The program may be stored in a computer-readable storage medium, for example, ROM/RAM, disk and CD.

Although the invention has been described through some exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalent.

What is claimed is:

1. An optical network terminal (ONT), comprising:
   a passive optical network (PON) protocol processing module; and
   a medium access control (MAC) bridge module coupled to the PON protocol processing module via an internal interface, wherein the MAC bridge module comprising a port rate limiting module is configured to store a plurality of port rate limiting attributes used to control the rate of data transmitted through the MAC bridge module.

2. A method for controlling data transmission through a medium access control (MAC) bridge using an optical network terminal (ONT), comprising:
   storing a plurality of port rate limiting attributes in a port rate limiting module disposed within the MAC bridge module in the ONT; and
   controlling the rate of data transmitted through the MAC bridge module using the plurality of port rate limiting attributes in the port rate limiting module.

3. The method of claim 2, further comprising:
   sending, at the port rate limiting module, a command for configuring port rate limiting attributes to an optical line terminal (OLT); and
   receiving, at the port rate limiting module, an ONU management and control interface (OMCI) message carrying the plurality of port rate limiting attributes from the OLT through the OMCI path.

4. The method of claim 3, wherein the command for configuring port rate limiting attributes is sent by means of direct control or remote control.

5. The method of claim 4, wherein direct control means control based on a local serial port, and remote control mode means control based on at least one of: Telnet and an NMS.

6. The method of claim 2, wherein the plurality of port rate limiting attributes comprise at least one of: an ONT ID, a port number of a user network interface (UNI) that needs configuration of port rate limiting attributes, and a rate description parameter of the UNI.

7. The method of claim 6, wherein the rate description parameters comprise at least one of: an upstream peak information rate, an upstream sustained information rate, a downstream peak information rate, and a downstream sustained information rate.

8. The method of claim 2, further comprising:
   receiving, at the port rate limiting module, data from a user network interface (UNI);
   calculating, at the port rate limiting module, the rate of the data received from the UNI or sent to UNI.

9. The method of claim 8, wherein the rate of the data includes at least one of: a peak rate and a sustained rate.

10. The method of claim 8, wherein the traffic control is performed for the UNI based on at least one of: a tail drop and random drop policy.

11. The ONT of claim 1, wherein the port rate limiting module, further configured to send a command for configuring port rate limiting attributes to an optical line terminal (OLT); and receive an ONU management and control interface (OMCI) message carrying the port rate limiting attributes from the OLT through an OMCI path.

12. The ONT of claim 11, wherein the port rate limiting module, further configured to store the plurality of port rate limiting attributes into a management entity (ME).

13. The ONT of claim 12, wherein the ME is a user network interface (UNI) traffic descriptor ME or the ME with additional parameters of port rate limiting attributes.

14. The ONT of claim 1, wherein the port rate limiting attributes comprise at least one of: an ONT ID, a port number of a user network interface (UNI) that needs configuration of port rate limiting attributes and a rate description parameter of the UNI.

* * * * *